Aug. 19, 1924.  
C. E. PEAVEY  
1,505,800  
DOUGHNUT MOLDER OR FORMER  
Filed April 3, 1922  
2 Sheets-Sheet 1
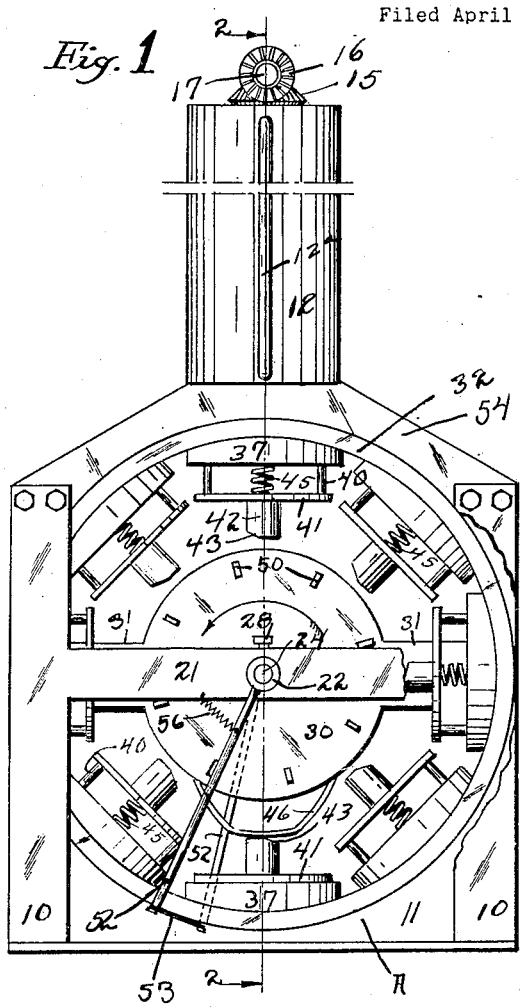
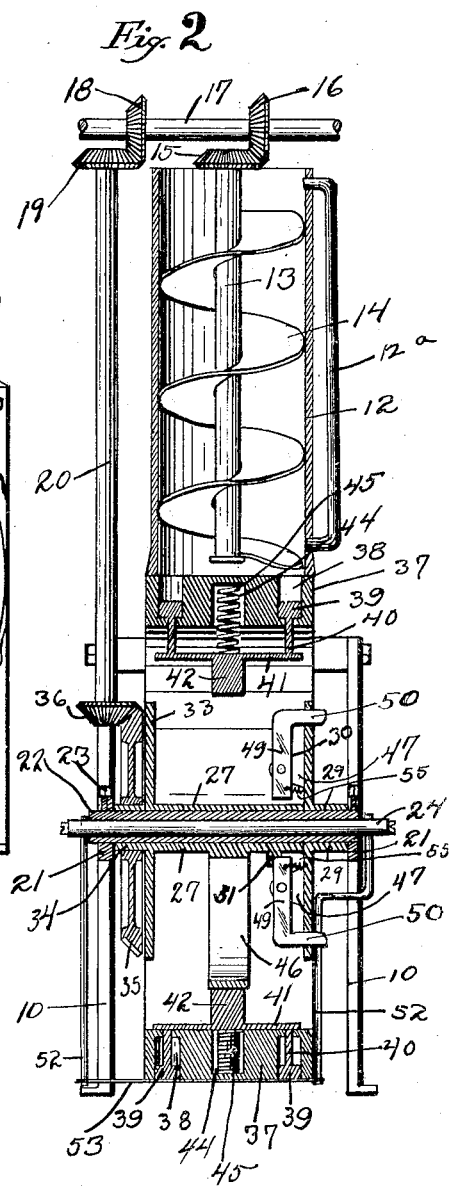

Aug. 19, 1924.
C. E. PEAVEY
DOUGHNUT MOLDER OR FORMER
Filed April 3, 1922     2 Sheets-Sheet 2
1,505,800
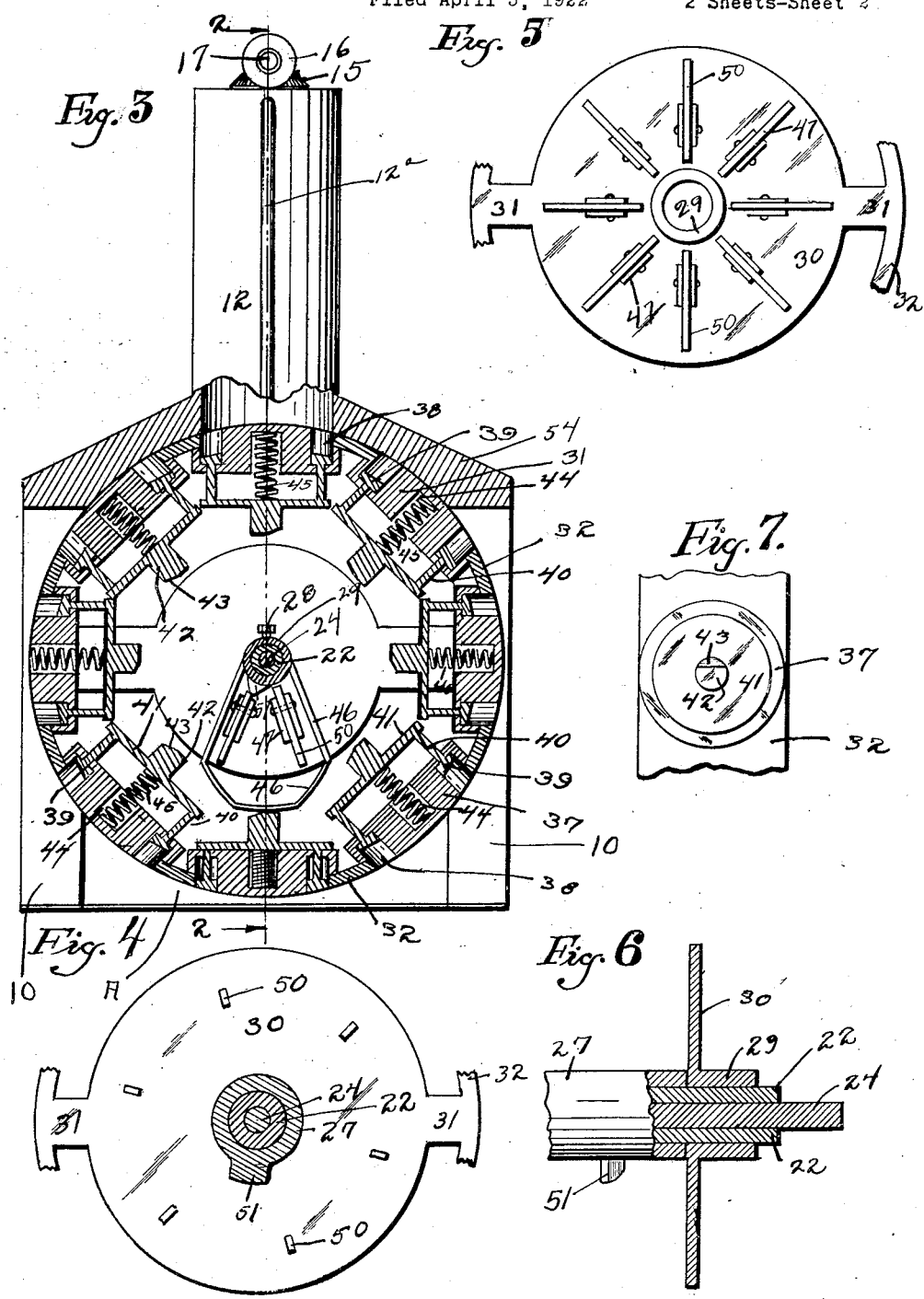

Patented Aug. 19, 1924.

1,505,800

UNITED STATES PATENT OFFICE.

CARLYLE E. PEAVEY, OF MINNEAPOLIS, MINNESOTA.

DOUGHNUT MOLDER OR FORMER.

Application filed April 3, 1922. Serial No. 549,107.

*To all whom it may concern:*

Be it known that I, CARLYLE E. PEAVEY, a citizen of the United States, and a resident of Minneapolis, in the county of Hennepin and State of Minnesota, have invented a certain new and useful Doughnut Molder or Former, of which the following is a specification.

The object of my invention is to provide a doughnut molder or former of simple and novel and effective construction, for cutting or forming doughnuts rapidly from a supply of dough in a container or magazine.

More particularly it is my object to provide a doughnut molder or former of the type in which a certain amount of dough is forced into a form or mold or die, and is severed or cut off, and is then discharged from the mold or die.

Still a further object is to provide such a device in which the molds are adjustably mounted for bodily rotating movement around a common center, so that the action of the machine may be substantially continuous.

A further object is to provide suitable means for preventing the doughnuts from sticking to the molds.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a side elevation of a doughnut molding or forming machine embodying my invention.

Figure 2 shows a vertical, sectional view taken on the line 2—2 of Figure 1.

Figure 3 shows a side elevation partly in section taken on the line 3—3 of Figure 2.

Figure 4 shows an enlarged, side elevation of the form which carries the cleaner wire operating fingers.

Figure 5 shows the opposite side of the mold.

Figure 6 is an enlarged, sectional view of the main shaft for the rotating drum, and the parts mounted thereon; and Figure 7 shows a plan view of one of the doughnut molds or formers or dies as seen from the inside of the drum.

In the accompanying drawings the reference numeral 10 has been used to indicate upright corner frame members of which there are four in number.

These frame members support a stationary frame 11 having a large central opening extending transversely through it to receive what we may for convenience call the doughnut former carrying drum.

Mounted above the frame 11 and projecting through the upper portion thereof is a dough container or magazine 12, in which is mounted a shaft 13 on which is a spiral conveyor 14 for forcing the dough toward the lower end of the magazine.

On the upper end of the shaft 13 is a bevelled gear 15 in mesh with a bevelled gear 16 on a horizontal shaft 17.

On the shaft 17 is another bevelled gear 18 in mesh with a bevelled gear 19 on a vertical shaft 20, extending downwardly along side the magazine 12.

The upright frame members 10 at each side of the machine are connected by a horizontal frame member 21.

Mounted on the opposite frame members 21 is a sleeve 22 which may be fixed to the frame member 21 by means of set-screws 23. Rotatably received in the sleeve 22, having its ends projecting beyond the sleeve 22 is a shaft 24, to which the cutter wire supporting arms hereinafter referred to are fixed.

On the central part of the sleeve 22 is mounted a shorter sleeve 27 which is fixed to the sleeve 22 by means of a set-screw 28.

Mounted on one end of the sleeve 22 (the right-hand end as shown in Figure 2) is a hub or sleeve 29 on which is a disc 30, the inside of which is shown in Figure 5, and the outside of which is shown in Figure 4.

Extending away from the disc 30 and diametrically opposite each other are arms 31 which support an annular drum 32.

A similar disc 33 is mounted adjacent to the opposite end of the sleeve 22 and has similar arms connected with the drum 32.

The drum 32 fits snugly for rotation in the opening in the frame 11, as illustrated in Figure 1.

Mounted on the hub 34 of the drum 33, and fixed thereto is a bevelled gear 35, which meshes with a bevelled gear 36 on the lower end of the shaft 20.

On the drum 32 is a series of what may be called doughnut forming dies 37. Each of the dies 37 has its outer surface flush with the outer surface of the drum 32, and has in its outer face an annular groove 38.

Seated in each groove 38 is an annular plunger 39 having preferably a pair of stems 40, slidably mounted in the doughnut forming die 37, as illustrated in Figure 2. The stems 40 are connected at their inner ends with a disc or the like 41, which has a central inwardly extending member 42, the inner edge of which is bevelled for a portion of its area at 43, for a purpose hereinafter more fully explained.

In the inner surface of each doughnut forming die 37 is a recess 44, in which is mounted a coil spring 45, which bears against the outer face of the disc 41, for normally holding the plunger 39 at the bottom of the groove 38.

On the sleeve 37 is mounted a cam 46 so arranged that as the doughnut forming dies approach their lowermost position in the rotation of the drum, the bevelled face 43 engages such cam 46 for forcing the plunger 39 outwardly for thereby forcing outwardly the contents of the groove 38.

On the inner side of the disc 30 is a series of brackets 47, arranged in pairs around the disc as shown in Figure 5.

Pivoted between the pairs of brackets 47 are engaging devices for engaging the wire supporting arms, hereinafter mentioned, and comprising radially arranged arms 49 pivoted between their ends, as shown for instance in Figures 2 and 5.

Each arm 49 has an outwardly extending finger 50, projecting through a slot in the disc 30, as shown in Figure 2.

On the sleeve 27 is a cam faced lug 51, shown in Figures 2, 3, 4, and 6, and arranged in the path of travel of the inner ends of the arms 49.

Fixed to the shaft 24 are downwardly hanging arms 52, the outer ends of which are located at different points circumferentially of the drum from each other, as illustrated for instance in Figure 1.

The outer ends of the arms 52 are connected by a clean off wire 53, which fits snugly against the outer face of the drum 32.

In the practical use of my improved doughnut forming machine, the dough is placed in the magazine or receptacle 12.

The shaft 17 is rotated from any suitable source of power, and serves to rotate the shaft 13 and the spiral conveyor or worm conveyor 14, for forcing the dough toward the doughnut forming dies.

As the doughnut forming dies 37 successively rotate and register with the lower end of the magazine 12, the dough is forced into the grooves 38 and is cut off as the dies leave the magazine, the lower part of which is surrounded by the cover member 54, which serves as a cut off member.

The frame 11 retains the doughnut in the die groove, during the travel of the drum from position where the dough was forced into the groove, to the die discharging position at the bottom of the machine where the frame 11 is opened to permit the discharge of the doughnut which has been formed, and permitting the proper operation of the clean off wire 53.

As the doughnut forming die, under consideration, approaches the bottom of the machine, the bevelled face 43 engages the cam 46, and the plunger 39 is forced outwardly against the pressure of the spring 45, for forcing the formed doughnut out of the die at the bottom of the machine.

The plungers 39 have their outer faces shaped so as to form part of the face of a cylinder, as clearly illustrated for instance in Figure 3.

The fingers 50 are normally held in position projecting through the slots in the disc 30 by means of springs 55 connected with the arms 49, and shown for instance in Figure 2.

Before the plunger 39 starts its outward movement, the proper finger 50 engages one of the arms 52, as shown in Figure 1, and carries the arms 52 with the rotation of the drum, until said arms move from their positions shown in Figure 1 to position extending downwardly and toward the right where the wire 53 will stand approximately at the point marked A in Figure 1.

In this connection it may be mentioned that in Figure 3 the parts are looked at from the opposite side from that seen in Figure 1.

After the outward movement of the plunger has been completed, the inner end of the arm 49 engages the cam 51, Figures, 2, 3, and 4, and is forced outwardly for retracting the finger 50, permitting it to clear the arm 52, whereupon the spring 56 will bring the arms 53 back to their original position with a quick movement, causing the wire 52 to scrape over the outer faces of the drum 32, and the plunger 39, which has been actuated. This action of the wire serves to clean off any doughnuts which might possibly stick to the plunger or the doughnut forming die.

It will be seen from the foregoing description, that the action of the doughnut forming machine shown and described herein, is positive.

The drum and the spiral conveyor are operated circumferentially by the mechanism described, so that the proper amount of dough will be forced into the doughnut forming die grooves, which successively register with the dough magazine, and the doughnut is formed as the die leaves the receptacle.

The doughnut thus formed is forced out of the die by the action of the plunger, and is prevented from sticking to plunger by the wire 53.

The machine forms doughnuts automatically with great rapidity.

Some changes may be made in the construction and arrangements of the parts of my improved doughnut forming machine without departing from the real spirit and purpose of my invention, and it is my intention to cover by my claims any modified forms of structure or use of mechanical equivalents which may be reasonably included within their scope.

A pipe 12a leads from the lower part of the magazine 12 to the upper part of the dough supply to relieve congestion if the conveyor 14 should feed somewhat faster than the dies take the dough away.

I claim as my invention:

1. In a doughnut forming machine, a dough magazine having a discharge opening, a rotating member having a plurality of die cups or grooves arranged to successively register with said opening, means for discharging the contents from said cups, and means for removing dough from said member, comprising a cutter arranged to slide diagonally across said cups, and means for reciprocating said cutter.

2. In a doughnut forming machine, a dough magazine having a discharge opening, a rotating member having a plurality of die cups or grooves arranged to successively register with said opening, means for discharging the contents from said cups, and means for removing dough from said member, comprising arms arranged on opposite sides of said member at different points circumferentially thereof, a cutter secured to said arms, and means for simultaneously reciprocating said arms.

3. In a doughnut forming machine, a dough magazine having an open discharge end, means for moving dough in the magazine toward said discharge end, a series of dough forming dies each having an annular groove for receiving dough, means for moving said dough forming dies successively to position where the grooves therein register with the discharge end of said magazine, annular plungers in said grooves, means for normally holding said plungers in their retracted position, a cut off device adjacent to said magazine, means for actuating said plungers for forcing the formed doughnut out of said grooves, means for removing the doughnuts from the faces of the plungers, said last means comprising a wire, means actuated by the movement of said doughnut forming dies for moving said wire to a certain position of its movement, and means for imparting quick movement to said wire when said last means is rendered inoperative.

4. In a doughnut forming machine, a dough magazine having an open discharge end, means for moving dough in the magazine toward said discharge end, a series of dough forming dies each having an annular groove for receiving dough, means for moving said dough forming dies successively to position where the grooves therein register with the discharge end of said magazine, annular plungers in said grooves, means for normally holding said plungers in their retracted position, a cut off device adjacent to said magazine, means for actuating said plungers for forcing the formed doughnut out of said grooves, means for removing the doughnuts from the faces of the plungers, said last means comprising a wire, means actuated by the movement of said doughnut forming dies for moving said wire to a certain position of its movement, means for imparting quick movement to said wire when said last means is rendered inoperative, and means for rendering said wire moving means inoperative when the wire has been moved to a certain position of its movement.

5. In a doughnut forming machine, a dough magazine having a discharge opening, a rotating member having a plurality of die cups or grooves arranged to successively register with said opening, means for discharging the contents from said cups, and means for removing dough from said member, comprising a cutter arranged to slide diagonally across said cups, and means for reciprocating said cutter, said means including a yielding device and adjustable means carried by the rotating member arranged for actuating said cutter.

6. In a machine of the class described, a frame, a hollow rotating drum mounted thereon, a plurality of annular, outwardly opening die cups on said drum, annular plunger members slidably mounted in the respective cups, arms projecting inwardly from said plunger members, cross pieces connecting said arms, stems projecting inwardly from said cross members, springs interposed between said cross members and said cups, and a cam device for coacting with said stems, and a slidable cutter device actuated by said drum traveling across the open ends of said cups.

Des Moines, Iowa, February 2, 1920.

CARLYLE E. PEAVEY.